Oct. 29, 1968   J. E. BROWDER   3,407,540
SLIP GRINDING MACHINE
Filed Oct. 19, 1965   3 Sheets-Sheet 2
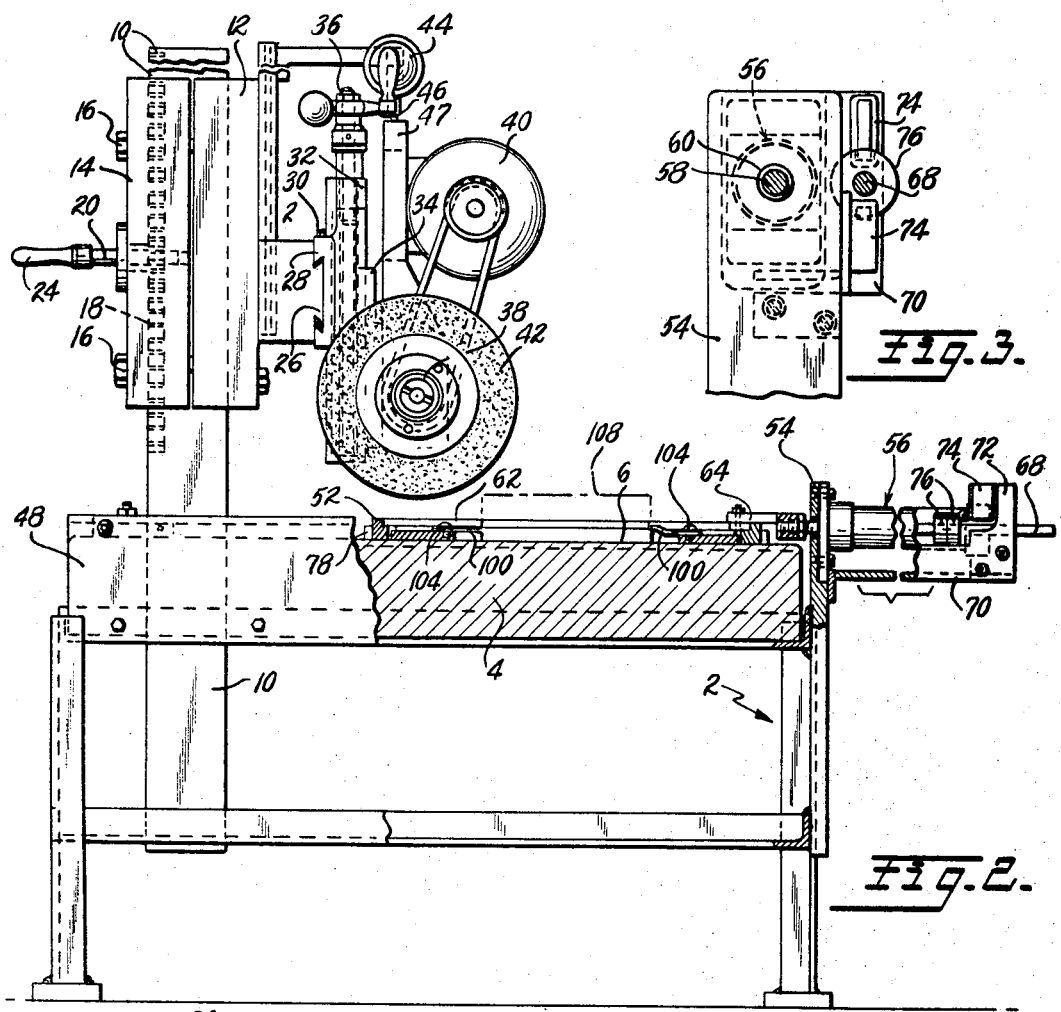
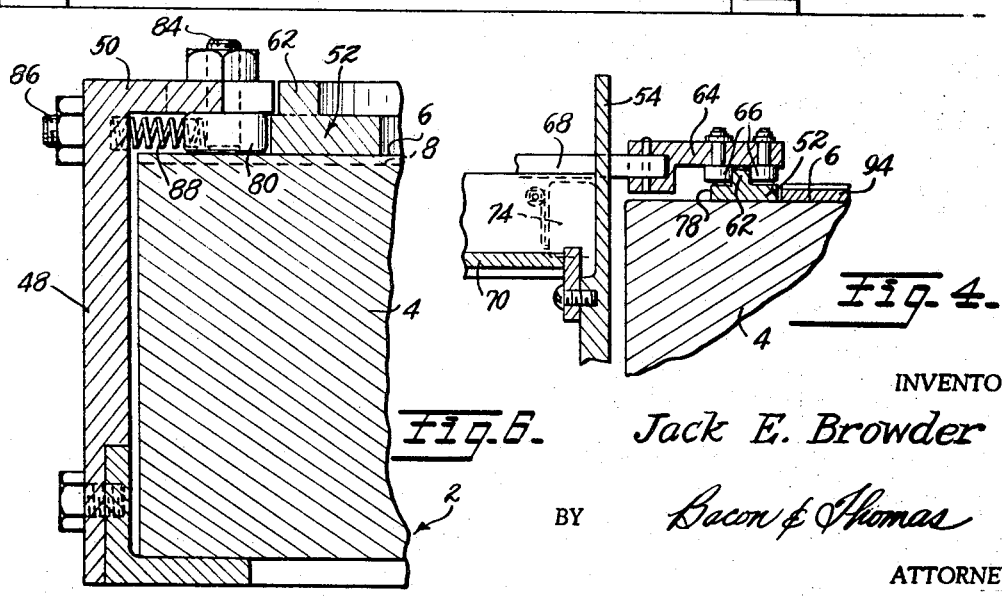
INVENTOR
Jack E. Browder
BY Bacon & Thomas
ATTORNEYS

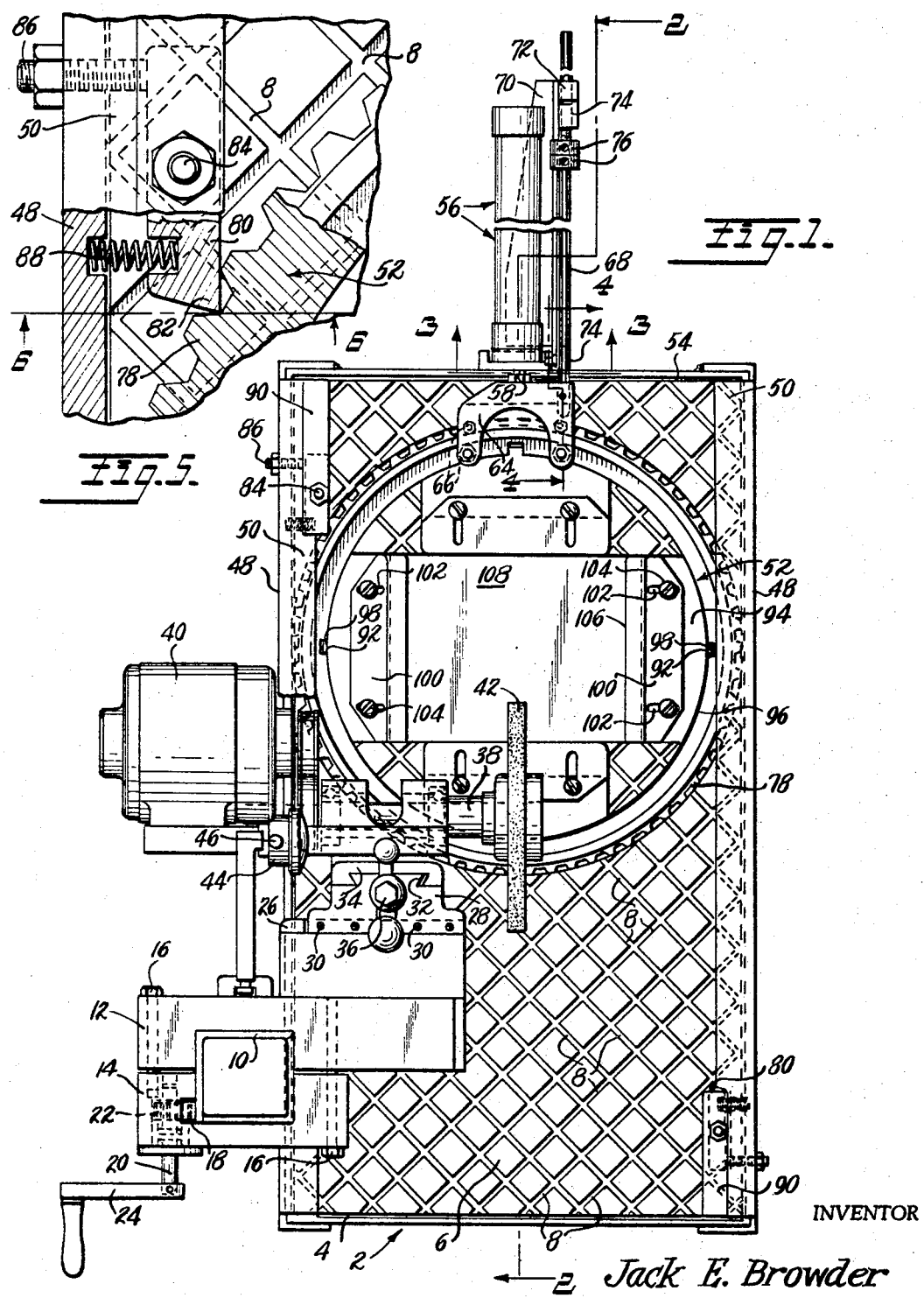

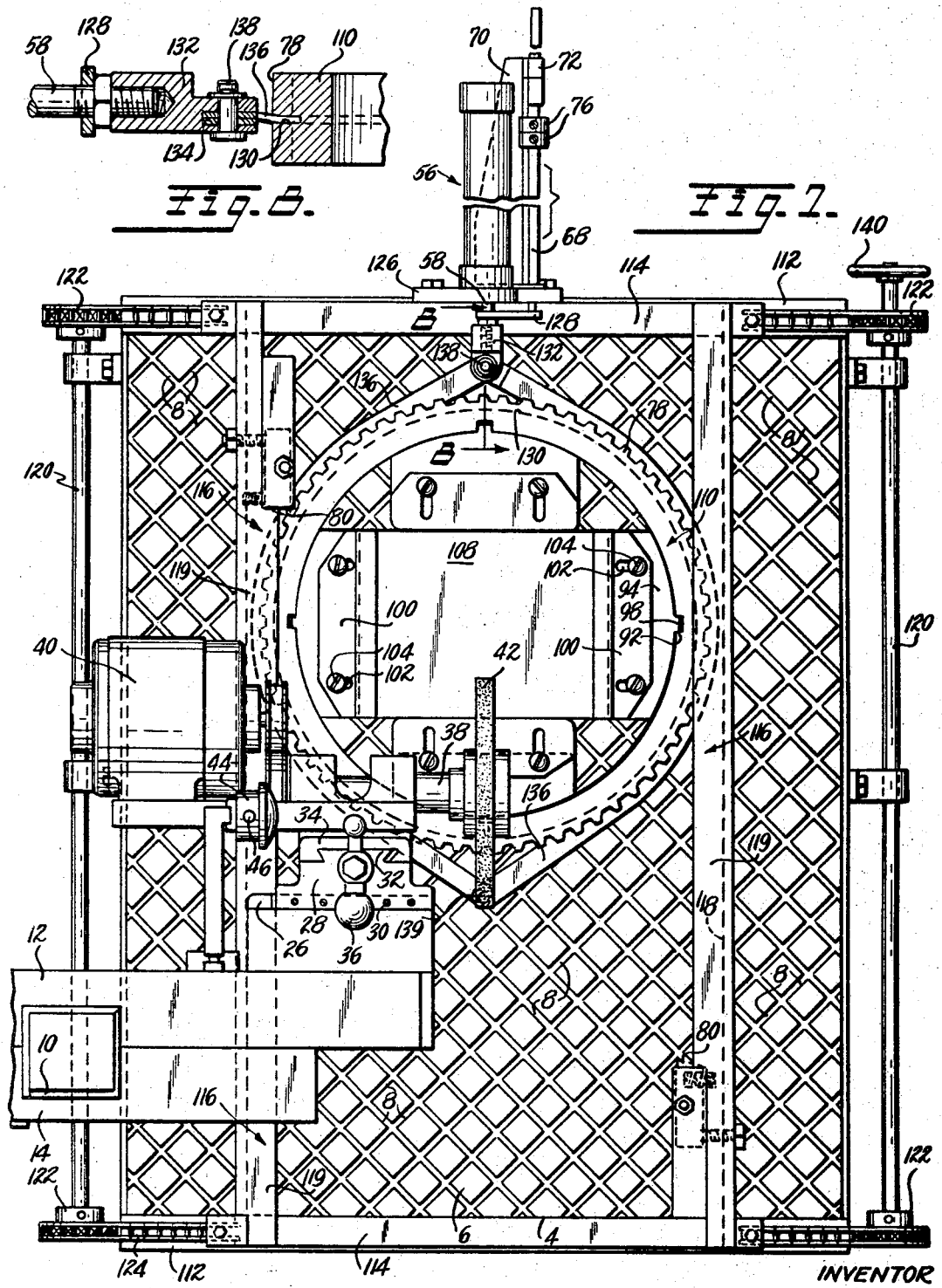

United States Patent Office 3,407,540
Patented Oct. 29, 1968

3,407,540
SLIP GRINDING MACHINE
Jack E. Browder, 604 Superior Ave.,
Dayton, Ohio 45407
Filed Oct. 19, 1965, Ser. No. 497,683
15 Claims. (Cl. 51—92)

ABSTRACT OF THE DISCLOSURE

A slip grinder has a stationary bed having a flat upper surface and an adjustable but normally stationary grinder head thereover. A ring-shaped work moving member rests and slides on the flat surface and has a central opening in which a workpiece can be placed to rest freely and slidably directly on the flat bed surface. Dogs on the ring-shaped member engage the sides of the workpiece and driving and guiding means cause the ring-shaped member to reciprocate on the flat surface and slide the workpiece under the grinding head. The ring-shaped member and workpiece are rotated about a vertical axis, through a small angle at each end of a stroke.

---

This invention relates to a slip grinding machine for accurately grinding flat parallel opposed faces on a workpiece.

The methods heretofore used for grinding various materials to have opposed flat and parallel faces has not been entirely satisfactory. Conventionally, such grinding was performed by mounting the workpiece on a carriage and traversing the same under a grinding head. The accuracies in such a machine were dependent on the fit of the carriage ways to the machine bed and extreme accuracy was difficult to achieve. There then developed the technic of resting a workpiece directly on a flat surface plate or bed member and manually sliding the same therealong under a grinding head. The possible accuracy was thus improved but the method presented many hazards and still would not achieve uniformly accurate results since the speed and direction of movement of the workpiece on successive passes under the grinding wheel could not always be made exactly the same as previous passes.

The present invention is directed to a machine wherein work gripping devices merely engage the workpiece at its lateral edges or sides while it rests freely on a surface plate or bed plate and the devices are power actuated to slide the workpiece under a grinding head in exactly duplicate cycles of reciprocation and further includes the incremental rotation of the workpiece at each cycle of reciprocation so as to develop extreme flatness and parallelism with the surface resting on the bed plate. Thus, by dressing the grinding wheel from the surface of the bed plate as a reference, a plane can be established which is precisely parallel to the surface of the bed plate which then serves to guide the workpiece.

It is, therefore, an object of this invention to provide a power operated slip grinder which is safe and efficient in operation and uniformly accurate in its result.

Another object is to provide such a power operated grinder which is adaptable to a wide range of workpiece shapes and sizes.

Still another object is to provide a slip grinding machine that is simple and rugged in construction yet highly efficient and reliable in operation.

Further and additional objects and advantages will become apparent to those skilled in the art as the description proceeds with reference to the accompanying drawings wherein:

FIG. 1 is a plan view of one form of machine embodying the present invention;

FIG. 2 is a vertical sectional view of the machine of FIG. 1, on a reduced scale, taken along the line 2—2 of FIG. 1;

FIG. 3 is an enlarged vertical sectional view taken along the line 3—3 of FIG. 1;

FIG. 4 is an enlarged sectional view taken along the line 4—4 of FIG. 1;

FIG. 5 is a horizontal sectional view of a portion of FIG. 6, with certain parts shown in elevation;

FIG. 6 is a vertical sectional view taken along the line 6—6 of FIG. 5;

FIG. 7 is a plan view, similar to FIG. 1, but showing a modification of the invention; and FIG. 8 is an enlarged vertical sectional view taken along the line 8—8 of FIG. 7.

Referring first to FIGS. 1–6, the machine of the present invention comprises any suitable frame structure 2 upon which a bed plate 4 is supported. The bed plate 4 may be of any usual or desired construction provided it is rigid and well-supported and defines an upper accurately flat surface 6. The bed plate 4 may be ferrous or non-ferrous and may be magnetic or non-magnetic. The surface 6 may be a continuous flat surface or may be provided with the crossed grooves 8 for the collection of debris and other products of the grinding operation without the danger of such material becoming positioned between the workpiece and the surface 6. In the particular embodiment shown, the bed plate 4 comprises a slab of granite having its upper surface 6 ground and polished to a precisely flat surface and provided with machined grooves 8. Preferably the surface 6 is impregnated with molybdenum disulphide to reduce friction.

The frame 2 includes an upstanding post 10, rigidly mounted thereon, and extending upwardly above the surface 6 off to one side of the frame 2 and adjacent one end thereof. A vertically adjustable slide structure, comprising a pair of recessed members 12 and 14, is arranged to embrace the post 10 and may be clamped to the post in any desired position of vertical adjustment by means of bolts 16 or the like. Post 10 is provided with a vertically extending rack bar 18 and one of the members, for example 14, has a shaft 20 and pinion 22 journalled thereon with the pinion in mesh with rack 18. A hand crank or the like 24 is secured to the shaft 20. Thus, it will be obvious that the slide structure 12–14 may be vertically adjusted along the post 10 to any desired elevation and then fixedly clamped in the desired position.

The member 12 extends laterally a short distance over the bed plate 4 and is provided with a horizontal dovetail guide 26 thereon. A carriage 28 is guided by the dovetail 26 and may be adjusted to any desired lateral position thereon, then locked in place by means of a conventional gib and set screws 30. The carriage 28 is itself provided with a vertical dovetail guide 32 and supporting a vertically adjustable carriage 34. A traversing screw and hand crank assembly 36, of well-known construction, is provided for effecting accurate micrometric vertical adjustment of the carriage 34 on the guide 32. A grinding head comprising an arbor 38, journaled on the carriage 34, and a motor 40 and grinding wheel 42 are mounted on the carriage 34 so that the grinding wheel may be coarsely adjusted in a vertical direction by manipulating the hand crank 20, then positioned at the desired lateral location over the bed plate 4 and finally precisely spaced from the upper surface 6 of the bed plate 4 by means of the micrometric adjustment 36. The spacing between the lowermost portion of the periphery of the wheel 42 and the surface 6 thus determines the thickness of the finished workpiece and the distance between the accurately parallel surfaces thereon. If desired, an indicator 44 may be adjustably mounted on the member 12 and provided with the usual plunger 46 engageable with a reference member 47 on carriage 34 to indicate vertical movements of the carriage 34.

The frame 2 includes side plates 48 (see particularly FIG. 6) extending upwardly on opposite lateral sides of the machine and terminating in upper horizontal flanges 50 overlying and spaced from the upper surface 6 of bed plate 4. An annular ring-like structure 52 rests slidably on the upper surface 6 of bed plate 4 and is of such diameter that its outer periphery just fits slidably between the inner faces of the vertical plates 48. The flanges 50 overlie opposed lateral portions of the ring 52 and thereby hold the same against undue vertical movement away from the surface 6. The plates 48 and flanges 50 thus constitute side rails for guiding the ring-like member 52 for rectilinear sliding movement over the surface 6 and along a path passing below the grinding wheel 42.

The frame 2 also includes a bracket plate 54 constituting a support for a reciprocatory fluid motor 56. The motor 56 is provided with a reciprocating driving rod 58 guided by a bushing 60 in the bracket plate 54 and extending therethrough toward the adjacent portion of the ring 52. The ring 52, in this embodiment of the invention, is formed with an upstanding concentric rib 62 thereon and the driving rod 58 is provided with a head 64, a portion of which overlies the ring 52. The overlying portion of the head 64 has pairs of rollers 66 journalled thereon with one roller of each pair bearing against the opposite side of rib 62 from the other roller (see FIG. 4). In this manner the driving rod 58 is capable of causing reciprocation of the ring 52 under the grinding wheel 42 and between the rails defined by plates 48 and flanges 50 while permitting free rotation of ring 52 about its central vertical axis. The head 64 further has a rod 68 fixed thereto and which extends outwardly generally parallel to the body of the fluid motor 56. A bracket structure 70 is secured to the frame 2 to aid in supporting the motor 56 and provides an outboard guide bushing 72 to slidably guide the rod 68. Suitable limit switches or the like 74 are mounted on the bracket 70 adjacent the ends thereof and adjustable stops 76 are provided on the rod 68. Thus, the stops 76 may be individually adjusted and fixed along the rod 68 to engage and actuate respective limit switches 74 at desired positions of the ring 52. Thus, by adjusting the stops 76, the length of stroke of the motor 56 and, therefore, the length of the rectilinear path of reciprocation of ring 52 may be adjusted and predetermined. The manner in which the limit switches 74 control the operation of the motor 56 is not shown but such means are conventional and well-known to those skilled in the art, whether the motor 56 be hydraulically or pneumatically operated. Obviously, instead of being limit switches, elements 74 could be control valves for motor 56, or other equivalent devices.

As shown, the outer periphery of the ring 52 is provided with a continuous series of ratchet teeth 78. In this embodiment the crests of the teeth 78 bear against the side plates 48 to effect guiding of the ring in the manner described.

Referring now to FIGS. 5 and 6, each flange 50 supports a pivoted pawl 80 having a nose portion 82 in position to engage a ratchet tooth 78 upon reciprocation of the ring 52. Each pawl 80 is pivoted to the flange 50 or a bracket thereon about an axis 84 and a stop screw 86 in each plate 48 limits the rotation of the pawl 80 in a direction to project its nose 82 inwardly of the machine. A compression spring 88 normally positions the pawl in the position shown in FIG. 5. As shown in FIG. 1, a pawl and its associated elements are mounted on each flange 50, at one end of the left hand rail and one at the opposite end of the right hand rail. The pawls 80 are preferably carried by separate brackets 90 capable of adjustment longitudinally of the machine to positions corresponding to the ends of the stroke of the ring 52 as determined by the adjustable stops 76. It will be obvious that as the ring 52 is driven downwardly, as seen in FIG. 1, the pawl 80 at the right hand side of the machine will eventually engage one of the ratchet teeth 78 slightly before the ring 52 reaches the end of its stroke. During the terminal portion of the stroke of the ring the pawl 80 will be effective to rotate the ring in a counter-clockwise direction through a small angle. The same action takes place at the other end of the stroke so the ring 52 is given an increment of rotation at each end of its stroke, both increments being equal and in the same direction. FIG. 5 may be assumed to indicate the position of the parts as the ring 52 is approaching the upper end of its stroke. It will be obvious that continued upward movement of ring 52 will result in its tooth 78 engaged by the pawl 80 being arrested and rotation of the ring in a counter-clockwise direction taking place during the terminal part of the stroke. During this terminal portion of the stroke the nose 82 of the pawl will be forced somewhat to the left, as seen in FIG. 5 this movement being permitted by the spring 88, without thus unduly stressing any of the structural elements or causing interference by adjacent teeth.

As previously described, the ring 52 is an annular structure resting on the surface 6 and open at its center. The inner periphery of the ring 52 is provided with any desired number of notches or keyways 92, angularly spaced therearound. Dog members 94 rest freely and slidably on the surface 6 and are provided with outer edges 96 complementary to the inner periphery of the ring 52 and keys 98 engaging the keyways 92. Thus, the dogs 94 are forced to slide with the ring 52 but any stresses or forces tending to raise the ring 52 is not transmitted to the dogs 94 since the keys 98 are free to slide vertically in keyways 92. Each dog 94 may be provided with a gripper plate 100 having slots 102 therein and through which the gripper plates are secured to the dogs 94 by screws 104. The gripper plates 100 will be configured so that their inner edges 106 conform to the adjacent side edge of a workpiece 108 positioned within the opening of the ring 52 and resting freely on the surface 6. Thus, for a rectangular workpiece as shown in FIG. 1, four dogs 94 and gripper plates 100 are provided so as to laterally confine the workpiece and provide for sliding the same along the surface 6 irrespective of its position of rotation about a vertical axis. Obviously, any desired number of plates 100 could be provided and they may be so configured as to engage a workpiece of any shape.

It will be obvious that, in operation, the motor 56 causes the workpiece 108 to slide along a rectilinear path between the wheel 42 and surface 6 so that the wheel will grind the upper surface of the workpiece to an accurately flat surface parallel to the surface 6. By virtue of the sequential increments of rotation imparted to the workpiece, its entire surface will be traversed by the wheel 42 and each increment of surface will eventually be traversed in both directions by the wheel, thus insuring a highly accurate and precisely flat surface.

The embodiment shown in FIGS. 7 and 8 comprises basic elements identical to those shown in FIGS. 1 through 6 and which bear the same reference numerals. However, as shown in this modification, the ring-like member 110 is not guided by rails fixed to the frame of the machine. Instead, the frame of the machine includes ledges or shelves 112 at opposite ends thereof and on which suitable slides 114 are positioned. Preferably, each slide 114 is of such height that its upper surface is substantially flush with the surface 6 of bed plate 4 although it may project slightly thereabove. Extending longitudinally of the machine and fixed at their opposite ends to respective slides 114, are guide rails 116. The guide rails 116 comprise vertical side plate portions 118 and horizontal flanges 120 spaced above the surface 6. The ring 110 is slidably guided between the rails 116, in a manner to be described. The frame of the machine of this embodiment is further provided with longitudinally extending shafts 120 journalled on opposite sides thereof and each shaft having two sprocket wheels 122 fixed thereon, each being in alignment with a corresponding wheel on the other shaft and laterally opposite the slides 114. A chain 124, at each end of the machine, is fastened at its ends to a slide 114 and trained over aligned sprocket wheels 122 in the manner shown. Thus, rotation of either shaft 120 will enforce equal rotation of the other shaft and cause both slides 114 to slide laterally through equal distances. The fluid motor 56 is mounted on a bracket 126 secured to one of the slides 114 so that the motor and its associated structure moves laterally with the rails 116, and is thereby always in alignment with the center of the ring 110. In this embodiment a bracket 128 may be secured to the driving rod 58 and to which bracket the slide rod 68 is fixed for purposes of actuating the adjustable stops 76 previously described. The ring 110 is not provided with an upstanding rib as described in connection with the first embodiment but is instead provided with a narrow peripheral groove 130 (see FIG. 8). The driving rod 58 is connected to the ring 110 through a clevis device 132 having a slot 134 in its outer end. A pair of arcuate, substantially rigid, bands 136 are positioned with their inner edges in the groove 130 and their ends secured in the slot 134 of clevis 132 by means such as the pin 138. The opposite ends of the bands 136 are likewise pivotally secured together by a pin or the like 139 similar to the pin 138. The lateral width of the bands 136 is such that their outer edges project outwardly beyond the crests of the ratchet teeth 78 and thus the outer edges of the bands 136 engage the plates 118 of rails 116 to slidably guide the ring 110 therebetween. There is sufficient clearance between the bands 136 and the groove 130 so that the ring 110 can freely rotate on the bands 136 in response to engagement of teeth 78 by the pawls 80, previously described.

By virtue of the lateral movability of the rails 116, even greater precision can be achieved than with the form shown in FIG. 1. Lateral movement of the rails 116, through rotation of the shafts 120, may be accomplished in any desired amount and at any desired time. Such movement may be accomplished by power driven means controlled by switches, cams or the like responsive to reciprocation of the ring 110 (not shown), or such lateral movement may be produced periodically by mere manual rotation of a shaft 120 through a hand wheel 140 or the like.

It will be obvious to those skilled in the art how power may be employed to rotate the shaft 120 at any desired times and in any desired amount and it is not deemed necessary to describe such means in detail.

While a limited number of specific embodiments of the invention have been shown and described, it is to be understood that the same are merely illustrative of the principles involved and that other embodiments may be employed within the scope of the appended claims.

I claim:

1. A grinding machine comprising: a frame having a stationary bed member thereon provided with a flat horizontal upper surface; a stationary grinding head spaced a predetermined distance above said upper surface; a work moving member of generally annular shape slidably supported on said upper surface and having an open central portion exposing said surface therein, inwardly facing means on said member drivingly engageable with only side surfaces of a workpiece in said central portion resting slidably on said upper suface; and means for cyclically reciprocating said work moving member, and any workpiece engaged thereby, over said upper surface along a predetermined path to slide said workpiece on said surface and under said grinding head.

2. A grinding machine as defined in claim 1 including rail members extending above said bed member and engageable with the outer edges of said annular body for guiding the same along a rectilinear path over said upper surface.

3. A grinding machine as defined in claim 2 including means for rotating said annular body, and the workpiece therein, through a small angle about a vertical axis at at least one end of its path.

4. A grinding machine as defined in claim 3 wherein said last-named means comprise cooperating elements on said annular body and said rail members, respectively.

5. A grinding machine as defined in claim 1 including means for adjusting the length of the path of movement of said work moving member.

6. A grinding machine comprising: a frame having a stationary bed member thereon provided with a flat horizontal upper surface; a stationary grinding head and means supporting the same spaced above said upper surface; spaced parallel side rails extending fixedly above said bed member adjacent opposite sides of said bed member; a generally ring-shaped work moving member slidably resting on said upper surface between said side rails and guided thereby for sliding movement over said upper surface along a rectilinear path extending under said grinding head; the central portion of said member being completely open and exposing said surface therein; work engaging members movable with said ring-shaped member, for engaging only the sides of a workpiece resting on said surface within said ring-shaped member; driving means for cyclically reciprocating said ring-shaped member along said path; and indexing means for rotating said ring-shaped member about its central vertical axis, through a small angle, at at least one end of its path of movement.

7. A grinding machine as defined in claim 6 wherein said ring-shaped member is provided with an upstanding annular rib concentric thereto; said driving means comprising a reciprocating motor device on said frame; a reciprocating driving rod extending from said motor device toward said ring-shaped member; a head on said driving rod having spaced rollers thereon, said rollers respectively engaging the inner and outer peripheries of said annular rib whereby to reciprocate said ring-shaped member along said path while permitting rotation thereof about said vertical axis.

8. A grinding machine as defined in claim 7 including stop means movable with said head and motor reversing means in the path of movement of said stop means to be engaged and actuated thereby to reverse said motor device; and means for adjusting the relative positions of said stop means and motor reversing means in a direction along said path to thereby adjust the length of stroke of said driving rod.

9. A grinding machine as defined in claim 6 wherein said means for rotating said ring-shaped member comprise spaced teeth on the outer periphery of said ring-shaped member and a pawl means adjacent one of said rails at an end of said rectilinear path, said pawl extending into the path of movement of one of said teeth to engage and arrest the same and thereby cause said ring-shaped member to rotate about said vertical axis during the terminal portion of a reciprocation thereof.

10. A grinding machine as defined in claim 9 including a second pawl means adjacent the other of said rails at the other end of said rectilinear path whereby said ring-shaped member is caused to rotate in the same direction at each end of its stroke.

11. A grinding machine as defined in claim 6 wherein said grinding head supporting means comprises an upstanding column on said frame; a support adjustable vertically along said column to provide a coarse vertical adjustment of said grinding head relative to said upper surface; a first carriage adjustable horizontally on said support in a direction transverse to said rectilinear path; a second carriage vertically adjustable on said first carriage; and means for effecting accurate vertical adjustment of said second carriage; said grinding head being mounted on said second carriage.

12. A grinding machine as defined in claim 6 wherein said ring-shaped member is provided with spaced notches on its inner periphery; said work engaging members comprising bodies slidably resting on said surface, within said ring-shaped member and each having a projection seated in one of said notches; and workpiece abutting elements carried by said bodies for adjustment thereon in a direction generally radial to said ring-shaped member.

13. A grinding machine as defined in claim 6 wherein said side rails are mounted on carriage means movable in a direction laterally of said rectilinear path; and means for selectively and incrementally moving said carriage means in said direction.

14. A grinding machine as defined in claim 6 wherein said ring-shaped member is provided with a peripheral groove extending around the outer periphery thereof; a driving member surrounding said ring-shaped member and slidably engaging in said groove whereby said ring-shaped member is rotatable therein; said driving means comprising a reciprocating motor device; a reciprocating driving rod extending from said motor device toward said ring-shaped member; said driving rod being secured to said driving member.

15. A grinding machine as defined in claim 14 wherein said indexing means include ratchet teeth on the outer periphery of said ring-shaped member; said driving member comprising a flat, generally annular structure with its inner edge in said groove and its outer edge extending outwardly beyond the crests of said ratchet teeth and slidably engaging said side rails to guide said ring-shaped member along said rectilinear path.

References Cited

UNITED STATES PATENTS

| | | | |
|---|---|---|---|
| 405,706 | 6/1889 | Hyde | 51—92 |
| 1,866,212 | 7/1932 | Huxford | 51—92 |
| 2,021,066 | 11/1935 | Huxford | 51—92 |
| 2,273,456 | 2/1942 | Zimmerman | 51—92 |
| 2,410,955 | 11/1946 | Torgerson | 51—92 |
| 2,740,237 | 4/1956 | Day | 51—133 |
| 3,048,949 | 8/1962 | Johnson | 51—216 |
| 3,304,662 | 2/1967 | Boettcher | 51—125.5 X |

ROBERT C. RIORDON, *Primary Examiner.*

D. G. KELLEY, *Assistant Examiner.*